United States Patent
Laugier

(10) Patent No.: US 6,429,437 B1
(45) Date of Patent: Aug. 6, 2002

(54) PHOTOSENSITIVE MATRIX ELECTRONIC SENSOR

(75) Inventor: Roger Laugier, Grenoble (FR)

(73) Assignee: Thomson-CSF, Paris (FR)

( * ) Notice: Subject to any disclaimer, the term of this patent is extended or adjusted under 35 U.S.C. 154(b) by 0 days.

(21) Appl. No.: 09/582,629

(22) PCT Filed: Jan. 26, 1999

(86) PCT No.: PCT/FR99/00149
§ 371 (c)(1),
(2), (4) Date: Jul. 26, 2000

(87) PCT Pub. No.: WO99/38031
PCT Pub. Date: Jul. 29, 1999

(30) Foreign Application Priority Data

Jan. 27, 1998 (FR) ............................................. 98 00850

(51) Int. Cl.[7] ................................................. G01T 1/20
(52) U.S. Cl. ............................. 250/370.11; 250/370.09; 250/483.1
(58) Field of Search ..................... 250/483.1, 370.09, 250/370.11; 423/448

(56) References Cited

U.S. PATENT DOCUMENTS

| | | | | |
|---|---|---|---|---|
| 5,427,817 A | * | 6/1995 | Goodman et al. | 427/65 |
| 5,748,274 A | * | 5/1998 | Taniguchi et al. | 349/133 |
| 6,031,234 A | * | 2/2000 | Albagli et al. | 250/370.11 |

FOREIGN PATENT DOCUMENTS

| | | | | |
|---|---|---|---|---|
| EP | 0 403 802 A | * | 12/1990 | |
| FR | 2 301 088 A | * | 9/1976 | |
| FR | 2 713 824 A | * | 6/1995 | |

* cited by examiner

*Primary Examiner*—Seungsook Ham
*Assistant Examiner*—Timothy Moran
(74) *Attorney, Agent, or Firm*—Oblon, Spivak, McClelland, Maier & Neustadt, P.C.

(57) ABSTRACT

A photosensitive matrix sensor include a faceplate of caesium iodide CsI mounted on a graphite base so as to transform high-frequency radiation, X-ray radiation, into low-frequency radiation, in the visible spectrum. It is shown that if the CsI is grown on such a graphite base, a sensor with much better resolution and much better sensitivity is obtained than if a gadolinium oxysulphide scintillator were used. Precautions in preparing the graphite may furthermore be taken rendering the surface of the graphite denser. It can thus be covered with a layer of amorphous carbon and or be made to undergo impregnation. This densification contributes to the homogeneity of the sensor. Protection of the CsI is then effected by a synthetic resin layer allied with a layer of liquid resin for optical coupling with a detector.

15 Claims, 1 Drawing Sheet

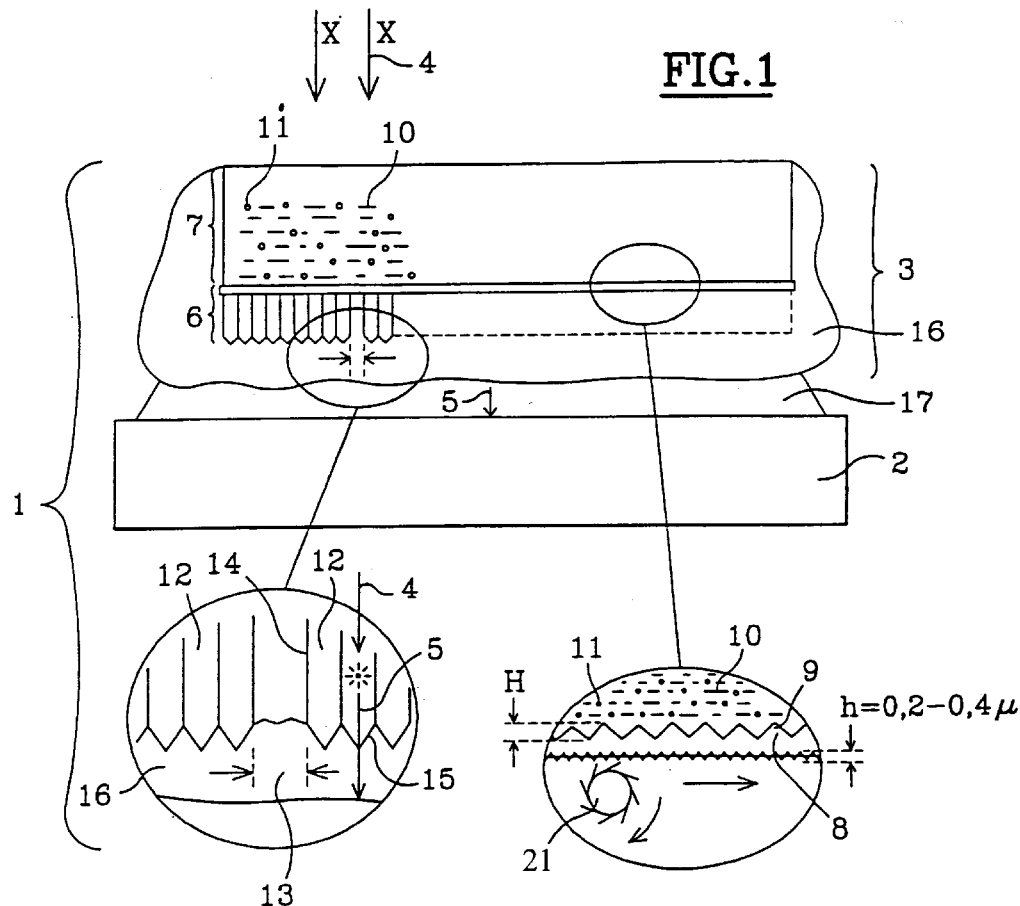

PHOTOSENSITIVE MATRIX ELECTRONIC SENSOR

BACKGROUND OF THE INVENTION

1. Field of the Invention

The present invention relates to a photosensitive matrix electronic sensor. It relates more particularly to X-ray radiation sensors. The object thereof is to improve the performance of sensors of this type.

2. Discussion of the Background

Radio logical image intensifier screens disposed opposite a detector and receiving X-ray radiation on another face are known in the field of X-ray electronic sensors. Scintillators are also known, in the field of nuclear medicine, for transforming gamma rays (or X rays) into visible radiation which can be detected by a detector. The detectors most commonly used are, in the field of radiology, cameras with target or assembled arrays of charge coupled devices (CCDs). In the field of nuclear medicine, use is also made of banks of photomultiplier tubes linked moreover to a barycentration electronic circuit. All these sensors with detectors incapable of directly detecting X rays are associated with scintillators tasked with transforming X rays into radiation in the approximately visible spectrum.

The material used to perform the transformation, the material of the scintillator, is normally gadolinium oxysulphide. The latter is used in the form of a thin deposit, typically of from 50 to 300 micrometers. This deposit consists of particles of this material which are bound together by a binder. The emission of visible light throughout the thickness, and in all directions, of this material causes a loss of sensitivity and a loss of resolving power of the detector, and hence of the sensor.

A proposal has already been made to deposit a film (plastic) containing gadolinium oxysulphide on a luminous image matrix detector, the latter consisting of a silicon integrated circuit.

Caesium iodide CsI, doped with thallium, in the form of needles, offers a beneficial alternative for greater luminous efficiency allied with a waveguide effect of the needles, whose cross sections have typical dimensions of from 3 to 6 micrometers. This material is conventionally used in radiological image intensifiers, by coating an input screen which generally consists of a domed aluminium foil. Embodiments are also known in which a wad of optical fibres is covered by such a material. The needles are oriented perpendicularly to the surface of the support which carries them. They only partially adjoin one another. They thus offer a porosity of 20 to 25%. These air-filled pores, associated with the favourable refractive index of CsI (1.78) afford channelling of the visible photons emitted in each needle and impart a higher sensitivity and resolving power.

However, difficulties in using CsI, as compared with gadolinium oxysulphide remain. One is aware, in particular, of the drawback that CsI hydrates rapidly in ambient air and customary humidities. This uptake of water has the effect of degrading the image obtained with the sensor. It causes a halo effect initially. This humidification then irreversibly degrades the needles with a consequent loss of luminous efficiency and resolving power of the sensor. It should be noted that this drawback is not encountered in radiological image intensifier tubes since the CsI is in the vacuum tube.

Moreover, although present in small quantities in the needles, thallium is highly toxic. The low mechanical fastness of CsI then causes dust and waste matter, the elimination of which must be scrupulously controlled. In certain cases, the passivation of the thallium-doped CsI is achieved by vaporizing a layer of aluminium on the surface of the scintillator.

On account of its low mechanical fastness, the CsI must be deposited on a rigid support. The bending of the support would in fact give rise to visible defects in the image. This support must moreover normally undergo, without deforming, a heat treatment to diffuse the thallium at a temperature of the order of 300°.

In radiological image intensifiers, the support is made of aluminium, sometimes allied with amorphous carbon, or even replaced with amorphous carbon on account of the very great resistance of this material.

Outside of the construction of image intensifier tubes, the depositing of caesium iodide on beryllium has been envisaged. However, this material has the drawback of being excessively expensive.

SUMMARY OF THE INVENTION

The object of the invention is to solve these problems by advocating the growing of a CsI layer on a base consisting of a machined graphite block, preferably having the particular feature of exhibiting low surface roughness. Preferably, in the invention the graphite used as a base has undergone, at its surface, a densification step so as to eliminate the natural porosity thereof related to the graphite. Moreover, this layer thus rendered denser is preferably then ground so as to impart a low roughness thereto. It has then been found that, when deposited in the gaseous phase, the CsI adopts an entirely beneficial growth: the needles are regularly spaced and the surface of the scintillator thus produced is almost flat despite the defects related to the roughness of the graphite.

If the base is not made to undergo the densification operation, differences in sensitivity result within the sensor produced. One can attempt to put this right. For example, if the graphite surface is striated (for example with parallel lines), the presence of these striations is recognized in the image obtained after operation of the sensor. It is possible, especially in the field of nuclear medicine, to correct the differences in sensitivity relating to the various locations through software processing. In an enhancement according to the invention, one limits the magnitude of this correction through the densification operation and/or the grinding operation.

In all cases, the presence of the graphite base affords the solution to the problems of differential expansion occurring during the diffusion of the thallium.

Graphite, such as understood within the present invention, is a material which differs from amorphous carbon in the sense that it has a porous physical structure, unlike amorphous carbon which is very dense. Graphite can be machined with metal tools, whereas amorphous carbon is almost only machinable with diamond-encrusted tools.

This is why, in the application envisaged here, namely the deposition of caesium iodide on a machined support intended to be placed in front of a matrix image detector, it proves to be especially beneficial to use a graphite block as support.

Graphite usually has a structure which is not only porous but also lamellar, thereby further facilitating its machining, unlike amorphous carbon, whose structure is essentially isotropic.

In principle graphite is obtained by compressing carbon powder at high temperature, whereas amorphous carbon results from decomposition in the gaseous phase (cracking) culminating in the growth of coatings of greater or lesser thickness on a starting support. It is therefore easier to produce machinable blocks from graphite, whereas it appears to be easier to produce amorphous carbon coatings on surfaces such as the domed surfaces of radiological image intensifier input screens.

The subject of the invention is therefore a photosensitive matrix electronic sensor comprising a matrix image detector surmounted by a scintillator for transforming high-frequency electromagnetic radiation, typically X-ray radiation, into low-frequency radiation, typically radiation in the visible domain, characterized in that the scintillator comprises a caesium iodide faceplate carried by a graphite base disposed on the side where the high-frequency radiation is received.

Its subject is also a process for fabricating a sensor, characterized in that

- a graphite base is made, this base having to serve as support for a scintillator,
- the graphite base is ground,
- caesium iodide is deposited in the gaseous phase on the graphite base,
- the caesium iodide deposition is doped with thallium,
- a layer made of a synthetic resin is deposited under vacuum in the gaseous phase on the caesium iodide deposition,
- a layer of liquid optical coupling resin is deposited on the synthetic resin layer,
- a detector is applied flat against the liquid optical coupling resin layer.

BRIEF DESCRIPTION OF THE DRAWINGS

The invention will be better understood on reading the description which follows and on examining the figures which accompany it. The latter are given merely by way of wholly non-limiting indication of the invention. The figures show:

FIG. 1: the diagrammatic representation of the structure of the sensor according to the invention;

FIG. 2: a diagrammatic representation of a machine used to implement a process for passivating the caesium iodide layer.

DESCRIPTION OF THE PREFERRED EMBODIMENTS

FIG. 1 shows, according to the invention, a photosensitive electronic sensor 1, preferably a matrix sensor. The sensor 1 comprises a detector 2 surmounted by a scintillator 3. The purpose of this sensor is to transform X-ray radiation 4 or any other high-frequency radiation (which could also be gamma radiation) into low-frequency radiation 5. The radiation 5 can thus be emitted within the visible spectrum. The radiation 5 is then detectable by a detector 2. The detector 2 can be a conventional detector. In a preferred example, the detector 2 is of the CCD type, as indicated hereinabove. Each CCD device array forms a line of detection points. Juxtaposed arrays serve to form the various lines of a matrix image.

The sensor essentially comprises a caesium iodide faceplate 6 carried by a graphite base 7. The base is disposed on the side where the X-ray radiation is received. The graphite used according to the invention is preferably graphite with a lamellar structure, obtained by hot-compression of carbon powder. This type of graphite is inexpensive to produce, and above all inexpensive to machine since it can be machined with metal tools, whereas the structures of materials based on amorphous carbon can only be machined with diamond-encrusted tools.

The material used therefore takes the form of small agglomerated lamellae 10, stacked end-to-end above one another. The thickness of the base 7, in one example is of the order of 500 micrometers. In case the scintillator should be larger, it is possible to go up to 800 or 2000 micrometers. It is possible to go down to 200 micrometers if it is smaller. In addition to its good permeability to X-rays, the graphite affords the advantage of being black, that is to say of absorbing the visible radiations emitted in its direction by the scintillator and which contribute more to lowering the resolving power of the sensor than to increasing its sensitivity. In a preferred example, the quality of the graphite of the base 7 will be such that the grain size, the length of the lamellae, will be less than 5 micrometers, preferably of the order of or less than 1 micrometer. It has been observed in fact that, if the natural anisotropy of graphite were not controlled, it would lead to having grains of 20 micrometers. In this case, the quality of regularity of the thickness of the CsI faceplate 6 was inferior, it required more software corrections.

The base 7 is preferably covered, so as to be surface-densified, with a layer of amorphous carbon 8. The layer of amorphous carbon 8, whose thickness is of order of 3 to 20 micrometers, makes it possible to fill in the holes 9 present on the surface of the base 7 owing to its porosity. The atoms of the carbon layer 8 differ from those of the base 7 in that, in the layer 7, the porosity is larger and the carbon-graphite particles are oriented. The layer 8 of amorphous carbon is a denser layer which is unstructured, that is to say is not polycrystalline: the atoms are aggregated there on top of one another with no organization. This layer of amorphous carbon is for example deposited under vacuum in the vapour phase on the base 7.

As a variant, or as an adjunct, the graphite layer 7 may undergo previously, at the location where the caesium iodide layer 6 will have to grow, densification by impregnation. Such impregnation is for example achieved by covering that face of the graphite base 7 which is intended to receive the caesium iodide with a film made of an organic resin. This assembly is then subjected to a very high temperature (1000°). The effect of this is to split the resin, to separate within the resin the carbon atoms from the hydrogen atoms or other bodies to which they are bonded. These impurities are thus discharged naturally by evaporation. The effect of the high temperature is also to make the carbon atoms migrate by diffusion into the porosity spaces 11 of the base 7. To densify the useful surface of the base 7 still further, this impregnation operation can be repeated several times so as to increase the compact nature. In one example it is performed four times running.

As was indicated above, one may decide to allow imperfections in the surface to exist. In this case, one accepts that the essential aspect of the correction of the images obtained can be postponed to a software processing subsequent to their being obtained. In the invention, a grinding of the graphite surface is preferably effected, in particular after densification, with a grinding tool 21. Typically, the grinding action removes a small thickness of 5 to 10 micrometers from the top layer of the base 7 or from the layer 8 as appropriate. The depositing of the layer 8 can take place before or after grinding. This results in a roughness h of the order of from 0.2 to 0.4 micrometers, whereas without grinding the natural roughness H, especially without densification, may reach 130 micrometers, in particular if the size of the grains of the graphite is of the order of 20 micrometers.

The CsI is then grown by acting in a conventional manner. Needles 12 are thus obtained, the dimension of whose cross section is of the order of from 3 to 6 micrometers in diameter. The cross sections of the needles 12 can be of various sizes as is apparent in FIG. 1. In one example, the needles 12 are separated from one another, randomly, by a space 13 of between 1 to 3 micrometers. This space makes it possible to construct, with the needles 12, a change-of-medium face 14. The presence of this face 14 allied with the favourable refractive index of the CsI leads to fibre-optic-like operation of the needles 12. Stated otherwise, the transformations of radiation, the scintillations which occur in a needle 12, give rise to a radiation 5 which will be guided. If this radiation is oriented on emission thereof towards the detector 2, it exits normally from the needles 12 through their apex 15. On the other hand, if this radiation 5 is oblique, it is reflected, inside the needles 12 off the face 14 and finally exits through the apex 15. The portion emitted towards the base is absorbed by the black base 7. In one example, the layer 6 of CsI has a thickness of between 100 to 300 micrometers. Typically, it measures 180 micrometers.

The layer 6 is then itself doped with thallium in a conventional manner.

Lastly, the layer 6 of doped CsI is covered with a passivation layer 16. As compared with the prior art in which the passivation layer 16 was a silicone gel, involving gadolinium oxysulphide, the invention advocates that the passivation layer 16 be produced in the form of a transparent polymerized synthetic resin. This polymerized resin having the advantage of being more impervious and of preventing the evaporation of dust from CsI or from thallium, has the drawback however of not leading to a perfectly smooth outer surface. In the invention, the passivation layer 16 is then allied with a layer 17 of liquid resin for optical coupling with the detector 2. In this way, good thallium evaporation imperviousness is obtained without impairing the efficiency of the sensor.

FIG. 2 shows a machine which can be used to produce the passivation layer 16. This machine comprises three cells linked together. In a first cell 18, the material for producing the resin is introduced raw. In a preferred example this material is di-paraxylylene. This material is vaporized in the cell 18 at a temperature of 175° under a pressure of one torr (one millimetre of mercury). The first cell 18 is connected with a second cell 19 in which the vaporized material is subjected to vapour deposition. For example, the di-paraxylylene vapour is heated to 680° under a pressure of 0.5 torr. Subjected to this stress, the di-paraxylylene splits and is transformed into monomer paraxylylene. The paraxylylene thus prepared is introduced at ambient temperature and under a very low pressure of 0.1 torr into a third cell 20 where it is diffused as layer 16 over the needles 12 of the layer 6. The paraxylylene then recombines to form a poly-paraxylylene polymer by condensation. This condensation leads to the production of bridges above the porosity spaces 13 of the CsI layer without penetrating into the gaps.

It is possible to use a synthetic resin other than the resin designated hereinabove. The latter has the advantage however that it adheres well to CsI on the one hand and, on the other hand, that it allows the construction of bridges above the spaces 13 without filling in these spaces. Preferably, the resin used shall have a refractive index of between 1.78 and 1.45. Therefore, this resin having an index below that of CsI forms, on bonding with the latter, an antireflection layer. In one example, the layer 16 has a thickness of from 1 to 25 micrometers.

The liquid resin layer 17 is then spread over the passivation layer 16 (and remains there) so as to ensure good optical coupling. This resin preferably has a refractive index of less than 1.45. It is for example of the type of those used in the construction of liquid crystal cells. The thickness of the layer 17 is of the same order as that of the layer 16.

The detector 2 is then fixed to the base 7 by conventional mechanical means.

What is claimed is:

1. A photosensitive matrix electronic sensor comprising:
   a scintillator having a caesium iodide faceplate deposited on a graphite base; and
   a matrix image detector surmounted by the scintillator for transforming high-frequency electromagnetic radiation into low-frequency radiation,
   wherein the caesium iodide faceplate is disposed between said matrix image detector and said graphite base.

2. The sensor according to claim 1, wherein the base of the scintillator includes graphite whose grain size is less than 5 micrometers.

3. The sensor according to claim 1, wherein the base includes graphite covered with a layer of amorphous carbon.

4. The sensor according to claim 1, wherein the base includes graphite impregnated with carbon.

5. The sensor according to claim 1, wherein the faceplate of the scintillator is insulated from an ambient medium by a passivation layer including a synthetic resin covered with an optical coupling layer.

6. The sensor according to claim 5, wherein a refractive index of the resin of the passivation layer lies between 1.78 and 1.45 so as to form an antireflection layer.

7. The sensor according to claim 5, wherein
   the graphite base has a thickness of 200 to 2000 micrometers,
   the caesium iodide faceplate has a thickness of 100 to 300 micrometers, and
   the resin passivation layer has a thickness of 1 to 25 micrometers.

8. A process for fabricating a matrix image sensor, comprising:
   making a graphite base to serve as support for a scintillator;
   grinding the graphite base;
   depositing caesium iodide in a gaseous phase on the graphite base;
   doping the caesium iodide deposition with thallium;
   depositing a layer made of a synthetic resin under vacuum in the gaseous phase on the caesium iodide deposition;
   depositing a layer of an optical coupling resin on the synthetic resin layer; and
   applying a detector flat against the optical coupling resin layer.

9. The process according to claim 8, further comprising:
   treating a surface of the graphite before or after grinding by depositing a layer of amorphous carbon.

10. The process according to claim 8, further comprising:
    treating a surface of the graphite before grinding by impregnation.

11. The process according to claim 9, further comprising:
    treating a surface: of the graphite before grinding by impregnation.

12. The sensor according to claim 1, wherein the high-frequency electromagnetic radiation is x-ray radiation and the low-frequency radiation is visible radiation.

13. The sensor according to claim 1, wherein the base of the scintillator includes graphite whose grain size is less than or equal to 1 μm.

14. The sensor according to claim 5, wherein the synthetic resin is a polyparaxylylene resin.

15. The sensor according to claim 5, wherein the graphite base has a thickness of 500–800 μm, the caesium iodide faceplate has a thickness of 180 μm, and the resin passivation layer has a thickness of 1 to 25 μm.

* * * * *